(12) United States Patent
Ogiya et al.

(10) Patent No.: US 9,251,965 B2
(45) Date of Patent: Feb. 2, 2016

(54) WET-TYPE SOLAR BATTERY AND WET-TYPE SOLAR BATTERY MODULE

(75) Inventors: Kei Ogiya, Osaka (JP); Atsushi Fukui, Osaka (JP); Ryoichi Komiya, Osaka (JP); Ryohsuke Yamanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/521,362

(22) PCT Filed: Dec. 29, 2010

(86) PCT No.: PCT/JP2010/073835
§ 371 (c)(1),
(2), (4) Date: Jul. 10, 2012

(87) PCT Pub. No.: WO2011/086869
PCT Pub. Date: Jul. 21, 2011

(65) Prior Publication Data
US 2012/0325285 A1    Dec. 27, 2012

(30) Foreign Application Priority Data

Jan. 12, 2010  (JP) .................................. 2010-003979
Jun. 7, 2010   (JP) .................................. 2010-129949

(51) Int. Cl.
  *H01L 31/042*   (2014.01)
  *H01L 31/00*    (2006.01)
  *H01G 9/20*     (2006.01)

(52) U.S. Cl.
CPC ........... *H01G 9/2081* (2013.01); *H01G 9/2031* (2013.01); *H01G 9/2059* (2013.01); *Y02E 10/542* (2013.01)

(58) Field of Classification Search
CPC ................................................... Y02E 10/542
USPC ......................................................... 136/244
See application file for complete search history.

(56) References Cited

U.S. PATENT DOCUMENTS

| 4,927,721 | A | 5/1990 | Gratzel et al. | |
|---|---|---|---|---|
| 5,084,365 | A | 1/1992 | Gratzel et al. | |
| 6,069,313 | A * | 5/2000 | Kay | ............... 136/249 |
| 2006/0162770 | A1* | 7/2006 | Matsui et al. | ................. 136/263 |
| 2010/0012166 | A1 | 1/2010 | Yamanaka et al. | |
| 2010/0071743 | A1* | 3/2010 | Yamanaka et al. | ............ 136/244 |

(Continued)

FOREIGN PATENT DOCUMENTS

| CN | 101485037 | 7/2009 |
|---|---|---|
| CN | 201360009 | 12/2009 |

(Continued)

OTHER PUBLICATIONS

International Search Report for PCT/JP2010/073835 mailed Mar. 8, 2011.

*Primary Examiner* — Jeffrey T Barton
*Assistant Examiner* — Uyen Tran
(74) *Attorney, Agent, or Firm* — Nixon & Vanderhye, P.C.

(57) ABSTRACT

A wet-type solar battery including a support composed of a light transmissive material and a stack in which a conductive layer, a photoelectric conversion layer containing a porous semiconductor, a porous insulating layer, and a counter electrode conductive layer are stacked in this order is provided. The conductive layer is divided into a first region including a portion where the photoelectric conversion layer is to be formed on a surface thereof and a second region where the photoelectric conversion layer is not to be formed. A protection film for preventing internal short-circuiting, which is not greater in film thickness than the photoelectric conversion layer, is formed in at least a part around the photoelectric conversion layer on the surface of the first region.

6 Claims, 3 Drawing Sheets

(56) References Cited

U.S. PATENT DOCUMENTS

| | | | | |
|---|---|---|---|---|
| 2010/0101648 A1* | 4/2010 | Morooka et al. | | 136/261 |
| 2011/0073177 A1* | 3/2011 | Osawa | H01G 9/2027 | 136/256 |

FOREIGN PATENT DOCUMENTS

| | | | | |
|---|---|---|---|---|
| EP | 2 276 102 | 1/2011 | | |
| JP | 1-220380 | 9/1989 | | |
| JP | 2002-367686 | 12/2002 | | |
| JP | 2005-142089 | 6/2005 | | |
| JP | 2007-18809 | 1/2007 | | |
| JP | 2007-194039 | 8/2007 | | |
| JP | 2008-16351 | 1/2008 | | |
| JP | WO 2008004553 | * 1/2008 | | 136/256 |
| JP | 2008-257895 | 10/2008 | | |
| JP | 2009-289736 | 12/2009 | | |
| WO | WO 97/16838 | 5/1997 | | |

* cited by examiner

WET-TYPE SOLAR BATTERY AND WET-TYPE SOLAR BATTERY MODULE

This application is the U.S. national phase of International Application No. PCT/JP2010/073835 filed 29 Dec. 2010 which designated the U.S. and claims priority to JP 2010-003979 filed 12 Jan. 2010, and JP 2010-129949 filed 7 Jun. 2010 the entire contents of each of which are hereby incorporated by reference.

TECHNICAL FIELD

The present invention relates to a wet-type solar battery and a wet-type solar battery module.

BACKGROUND ART

A solar battery capable of converting sunlight to electric power has attracted attention as a source of energy replacing fossil fuel. Some solar batteries including a crystalline silicon substrate and some thin-film silicon solar batteries have currently been put into practical use. The former, however, is disadvantageous in high cost for manufacturing a silicon substrate, and the latter is disadvantageous in high manufacturing cost because of necessity for use of various semiconductor manufacturing gases or a complicated apparatus. Therefore, though efforts for reducing cost per generated power output have been continued by enhancing efficiency in photoelectric conversion in any solar batteries, the problems above have not yet been solved.

PTL 1 (Japanese Patent Laying-Open No. 1-220380) has proposed as a solar battery of a new type, a wet-type solar battery to which photoinduced electron transfer of a metal complex has been applied.

In this wet-type solar battery, a photoelectric conversion layer composed of an electrolytic material and a photoelectric conversion material having an absorption spectrum in a visible light region by adsorbing a photosensitizing dye is sandwiched between electrodes of two glass substrates each having the electrode on a surface thereof.

As the wet-type solar battery above is irradiated with light, electrons are generated in the photoelectric conversion layer, generated electrons are transferred to the electrode through an external electric circuit, transferred electrons are carried to the opposing electrode by ions in the electrolyte, and they return to the photoelectric conversion layer. Electric energy is taken out through such a series of flows of electrons.

PTL 2 (WO97/16838) has proposed a dye sensitized solar battery module in which a plurality of dye sensitized solar batteries are arranged as being connected in series on a glass substrate with single transparent conductive film.

An individual dye sensitized solar battery in this dye sensitized solar battery module has such a structure that a porous semiconductor layer (a porous titanium oxide layer) serving as the photoelectric conversion layer, a porous insulating layer (an intermediate porous insulating layer), and a counter electrode (a catalyst layer) are successively stacked on a transparent substrate (a glass substrate) where a transparent conductive film (an electrode) is patterned in strips. Among the dye sensitized solar batteries, adjacent dye sensitized solar batteries are connected in series to each other in such a manner that a transparent conductive film of a single dye sensitized solar battery and a counter electrode of a dye sensitized solar battery adjacent thereto are arranged to be in contact with each other.

PTL 3 (Japanese Patent Laying-Open No. 2002-367686) has proposed a dye sensitized solar battery module having such an integrated structure as having a transparent conductive film, a porous semiconductor layer, a separator, and a counter electrode conductive layer on a transparent substrate. This dye sensitized solar battery module has adopted a porous semiconductor layer constituted of a first photoelectrode composed of a dense material and a second photoelectrode composed of a porous material. By forming the first photoelectrode composed of the dense material directly under the second photoelectrode, contact of a material for the counter electrode conductive layer with the transparent conductive film is suppressed, and by providing the first photoelectrode composed of fine particles smaller in average particle size than fine particles in the material for the counter electrode conductive layer, fine particles in the counter electrode conductive layer are prevented from passing through a photoelectrode layer to reach the transparent conductive film.

CITATION LIST

Patent Literature

PTL 1: Japanese Patent Laying-Open No. 1-220380
PTL 2: WO97/16838
PTL 3: Japanese Patent Laying-Open No. 2002-367686

SUMMARY OF INVENTION

Technical Problem

Since the dye sensitized solar battery described in PTL 1 has such a basic structure that an electrolytic solution is introduced in between opposing glass substrates with transparent conductive film, it is possible to prototype a solar battery having a small area. It is difficult, however, to apply this structure to a solar battery having an area as large as 1 m square. Namely, as an area of a single solar battery cell is increased, a generated current increases in proportion to the area, however, voltage lowering in a direction of a plane of the transparent conductive film used for an electrode portion increases, which leads to increase in internal series resistance as the solar battery. Consequently, such a problem as lowering in FF (fill factor) in current-voltage characteristics at the time of photoelectric conversion as well as lowering in short-circuiting current and resultant lowering in efficiency in photoelectric conversion occur.

In addition, in the invention disclosed in PTL 3, the transparent conductive film is isolated by laser scribing or the like between a conductive layer portion where the first photoelectrode and the second photoelectrode (porous semiconductor layers) are formed and a conductive layer portion with which the counter electrode conductive layer comes in contact, and each of the first photoelectrode and the second photoelectrode is formed to correspond to an end of an insulating portion of the conductive layer. When each photoelectrode arranged as such is formed with screen printing, a portion small in film thickness (slump) is produced around a printed member such as a photoelectrode due to a property of printing. If such slump overlaps with an insulating portion of the conductive layer, which is a recess portion of the submicron order, the printed member such as a photoelectrode peels off, which leads to occurrence of failure and lowering in yield.

When a position where a photoelectrode is to be formed is spaced apart from the insulating portion in order to suppress peel off of the printed member such as the photoelectrode, in that portion (a portion in the vicinity of the insulating portion), only a separator which is a porous insulating layer is present between the counter electrode conductive layer and the conductive layer. It has been known that, with such a construction, a material for the counter electrode conductive layer is likely to reach the conductive layer through the porous insulating layer and if the material reaches the conductive layer, internal short-circuiting occurs.

In addition, as disclosed in PTL 3, as the first photoelectrode which is a dense layer is formed, internal short-circuiting decreases, whereas an amount of adsorption of a dye in a portion highest in light intensity lowers and a generated current lowers.

The present invention was made in view of the problems above, and the present invention provides a wet-type solar battery capable of achieving suppressed occurrence of failure due to internal short-circuiting and improving yield and a wet-type solar battery module including the wet-type solar battery.

Solution to Problem

As a result of dedicated studies for solving the problems above, the present inventors have found that an incidence of internal short-circuiting due to contact of a material for a counter electrode conductive layer with a conductive layer is greatly dependent on a film thickness of a layer interposed between the counter electrode conductive layer and the conductive layer. With further studies, the present inventors have found that internal short-circuiting frequently occurs on the conductive layer where only a porous insulating layer small in film thickness is present between the conductive layer and the counter electrode conductive layer, which causes significant lowering in yield. The present invention was completed based on the finding above.

Namely, a wet-type solar battery according to the present invention is a wet-type solar battery including a support composed of a light transmissive material and a stack in which a conductive layer, a photoelectric conversion layer containing a porous semiconductor, a porous insulating layer, and a counter electrode conductive layer are stacked in this order, the conductive layer is divided into a first region including a portion where the photoelectric conversion layer is to be formed on a surface thereof and a second region where the photoelectric conversion layer is not to be formed, and a protection film for preventing internal short-circuiting, not greater in film thickness than the photoelectric conversion layer, is formed in at least a part around the photoelectric conversion layer on a surface of the first region.

In the wet-type solar battery above, preferably, the protection film is formed on the surface of the first region, between the photoelectric conversion layer and a scribe line present between the first region and the second region.

In the wet-type solar battery above, preferably, the protection film is porous, and further preferably, the protection film has a pore diameter not greater than a particle size of particles forming the porous insulating layer.

In the wet-type solar battery above, preferably, a total film thickness of the protection film and the porous insulating layer stacked on the protection film is not smaller than 10 μM.

In the wet-type solar battery above, a material for the protection film preferably includes at least any of zirconium oxide and silicon oxide, and the protection film and the porous insulating layer are preferably identical to each other in material.

A second embodiment of the present invention is directed to a wet-type solar battery module including two or more wet-type solar batteries connected in series, at least one of the wet-type solar batteries is the wet-type solar battery according to the first embodiment above, and a counter electrode conductive layer of one wet-type solar battery of adjacent wet-type solar batteries is electrically connected to a conductive layer of the other wet-type solar battery.

Advantageous Effects of Invention

According to the present invention, a wet-type solar battery capable of achieving suppressed occurrence of failure due to internal short-circuiting and improving yield and a wet-type solar battery module including the wet-type solar battery can be provided. In particular in a case of a wet-type solar battery module, since internal short-circuiting caused by position displacement is noticeable, an effect of the present invention is extremely great.

DESCRIPTION OF EMBODIMENTS

Figure 1:
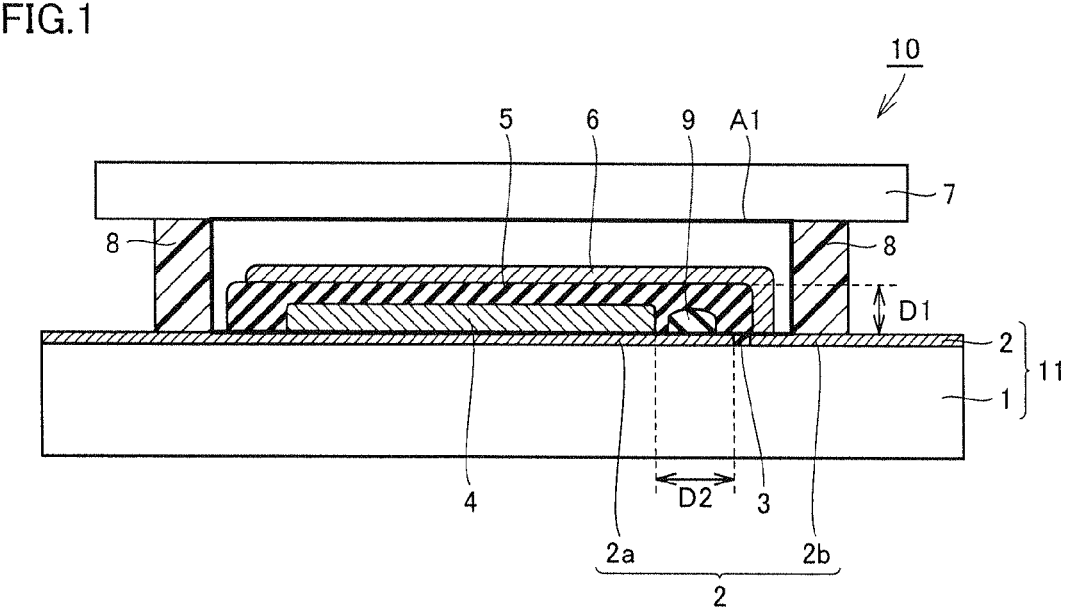
FIG. 1 is a schematic cross-sectional view showing one example of a layered construction of a wet-type solar battery in an embodiment of the present invention.

A suitable embodiment of the present invention will be described with reference to the drawings. It is noted that this embodiment is by way of example and embodiments in various forms are possible within the scope of the present invention. An element having the same reference character allotted in the drawings of the present application shows the same or corresponding element.

<Wet-Type Solar Battery>

FIG. 1 is a schematic cross-sectional view showing one example of a layered construction of a wet-type solar battery (hereinafter also referred to as a "solar battery" or a "dye sensitized solar battery") in an embodiment. In addition, FIG. 2 is a schematic top view showing a construction of a main portion of the wet-type solar battery in FIG. 1.

As shown in FIG. 1, a wet-type solar battery 10 includes a support 1 and a stack in which a conductive layer 2 formed on one surface on support 1, a photoelectric conversion layer 4, a porous insulating layer 5, and a counter electrode conductive layer 6 are stacked in this order. A cover layer 7 is provided above counter electrode conductive layer 6 and a sealing material 8 is provided on each of opposing sides of the stack.

Conductive layer 2 is divided into a first region 2a and a second region 2b by a scribe line 3, and photoelectric conversion layer 4 is formed on first region 2a. In addition, as shown in FIG. 2, protection film 9 for preventing internal short-circuiting, not greater in film thickness than photoelectric conversion layer 4, is formed in at least a part around photoelectric conversion layer 4 on a surface of first region 2a. It is noted that each film thickness of photoelectric conversion layer 4 and protection film 9 refers to a thickness in a vertical direction in FIG. 1.

Figure 2:
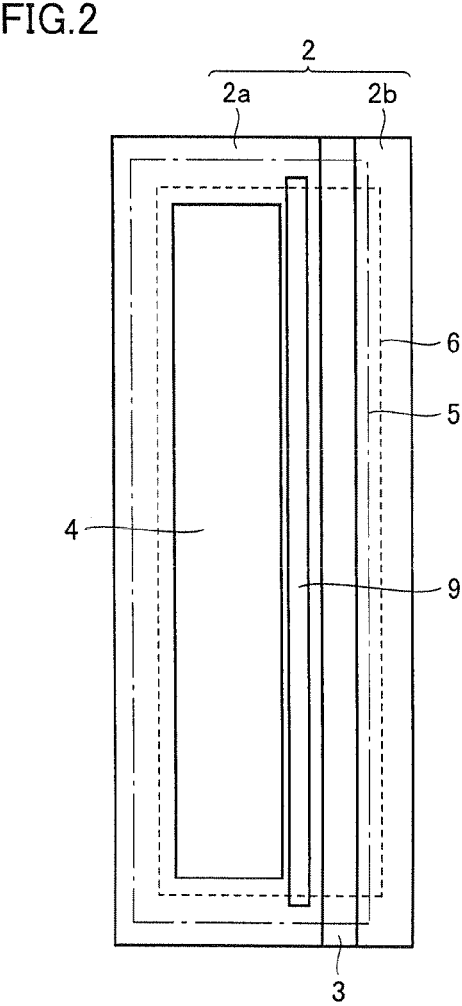
FIG. 2 is a schematic top view showing a construction of a main portion of the wet-type solar battery in FIG. 1.

In particular, as shown in FIG. 2, protection film 9 is preferably formed between photoelectric conversion layer 4 and scribe line 3 present between first region 2a and second region 2b. Namely, protection film 9 is preferably formed in a portion in the vicinity of scribe line 3 on the surface of first region 2a, where photoelectric conversion layer 4 is not formed. In this case, internal short-circuiting can efficiently be prevented. It is noted that, in FIG. 2, only contours of porous insulating layer 5 and counter electrode conductive layer 6 are shown with a chain dotted line and a dotted line, respectively, for easy understanding of arrangement of photoelectric conversion layer 4 and protection film 9 under porous insulating layer 5 and counter electrode conductive layer 6.

Figure 3:
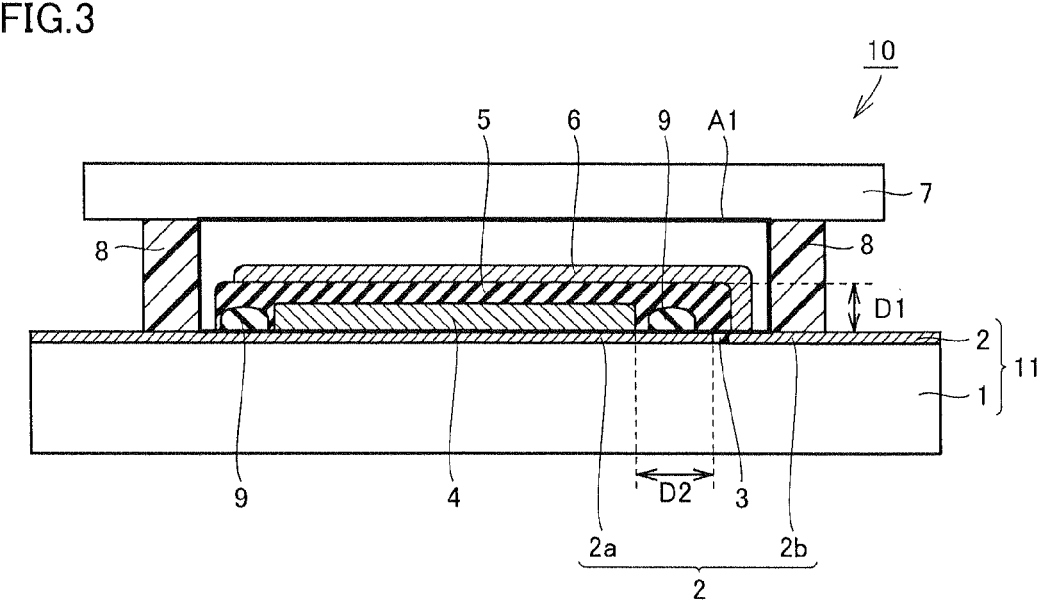
FIG. 3 is a schematic cross-sectional view showing another example of a layered construction of a wet-type solar battery in the embodiment of the present invention.
Figure 4:
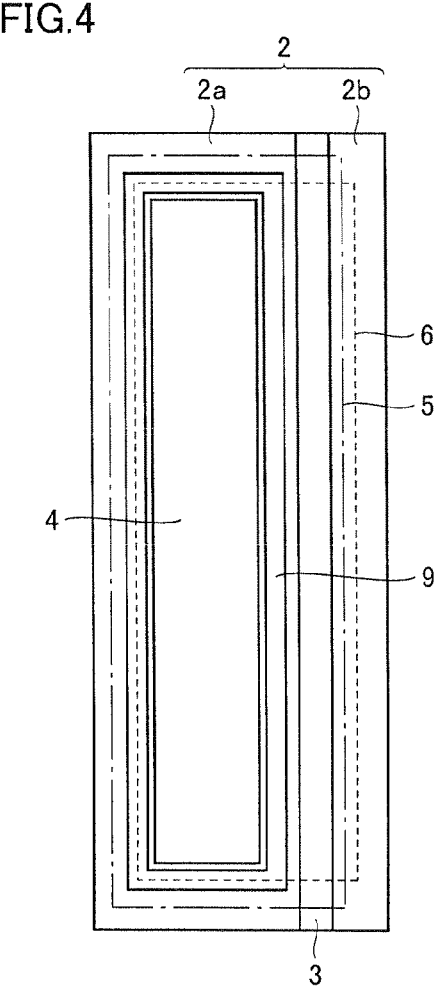
FIG. 4 is a schematic top view showing a construction of a main portion of the wet-type solar battery in FIG. 3.

In addition, as shown in FIGS. 3 and 4, protection film 9 may be formed to surround photoelectric conversion layer 4 on the surface of first region 2a. FIG. 3 is a schematic cross-sectional view showing another example of a layered construction of a wet-type solar battery in the embodiment of the present invention, and FIG. 4 is a schematic top view showing a construction of a main portion of the wet-type solar battery in FIG. 3. It is noted that, in FIG. 4, as in FIG. 2, only contours of porous insulating layer 5 and counter electrode conductive layer 6 are shown with a chain dotted line and a dotted line, respectively, for easy understanding of arrangement of photoelectric conversion layer 4 and protection film 9 under porous insulating layer 5 and counter electrode conductive layer 6.

As shown in FIGS. 3 and 4, by forming protection film 9 to surround photoelectric conversion layer 4, internal short-circuiting can more reliably be prevented. It is noted that reasons why protection film 9 prevents internal short-circuiting will be described later.

<Support>

Since support 1 should have a light transmissive property in its portion serving as a light receiving surface of a solar battery, preferably, it is composed of a material at least having a light transmissive property and it has a thickness approximately not smaller than 0.2 mm and not greater than 5 mm.

A material forming support 1 is not particularly limited so long as the material can generally be used for a solar battery and can exhibit an effect of the present invention. Examples of such a material include, for example, a glass substrate of soda glass, fused silica glass, crystal silica glass, and the like, a heat resistant resin plate such as a flexible film, and the like.

Examples of a material forming the flexible film (hereinafter also referred to as a "film") include tetraacetyl cellulose (TAC), polyethylene terephthalate (PET), polyphenylene sulfide (PPS), polycarbonate (PC), polyarylate (PA), polyetherimide (PEI), phenoxy resin, Teflon™, and the like.

In a case where other layers are formed on support 1 through heating, for example, in a case of forming conductive layer 2 on support 1 through heating to approximately 250° C., among the materials forming the flexible film, Teflon™ having resistance to heat not lower than 250° C. is particularly preferred.

In addition, support 1 can be made use of when a completed solar battery is attached to another structure. Namely, a peripheral portion of support 1 such as a glass substrate can readily be attached to another support 1 by using a metal-worked part and a screw.

<Conductive Layer>

Conductive layer 2 serves as a light receiving surface of a solar battery and should have a light transmissive property, and hence it is composed of a light transmissive material. It is noted that any material substantially allowing passage of light of a wavelength at least effectively sensitive to a sensitizing dye which will be described later should only be employed and the conductive layer does not necessarily have to have a property to transmit light in all wavelength regions.

A light transmissive material forming conductive layer 2 is not particularly limited so long as the material can generally be used for a solar battery and can exhibit an effect of the present invention. Examples of such a material include indium-tin composite oxide (ITO), fluorine-doped tin oxide (FTO), zinc oxide (ZnO), and the like.

A structure in which conductive layer 2 is stacked on support 1 may herein be referred to as a transparent electrode substrate 11. Specifically, an example of such a transparent electrode substrate 11 is a transparent electrode substrate in which conductive layer 2 composed of FTO is stacked on support 1 composed of soda lime float glass, which is suitably employed in the present invention.

Conductive layer 2 has a film thickness preferably not smaller than 0.02 μm and not greater than 5 μm, and a film resistance desirably as low as possible, preferably not higher than 40 Ω/sq.

For achieving lower resistance, conductive layer 2 may be provided with a metal lead. Examples of a material for the metal lead include platinum, gold, silver, copper, aluminum, nickel, titanium, and the like. It is noted that, in order to avoid lowering in an amount of incident light on a light receiving surface caused by provision of a metal lead, the metal lead preferably has a thickness not smaller than 0.1 mm and not greater than 4 mm.

<Scribe Line>

Scribe line 3 is formed by cutting conductive layer 2 with known laser scribing. Scribe line 3 divides conductive layer 2 into first region 2a including a portion where photoelectric conversion layer 4 which will be described later is to be formed on the surface thereof and second region 2b where the photoelectric conversion layer is not to be formed.

<Photoelectric Conversion Layer>

Photoelectric conversion layer 4 is obtained by adsorbing a dye or a quantum dot to a layer composed of a porous semiconductor and filling the layer with a carrier transport material. A photoelectric conversion layer may hereinafter be referred to as a porous semiconductor layer.

The porous semiconductor layer is composed of a semiconductor, and various forms such as a bulk form, a particulate form, and a film form having numerous small pores can be employed, however, a film form having numerous small pores is preferred.

A material forming a porous semiconductor is not particularly limited so long as the material is generally used as a material for photoelectric conversion. Examples of such a material include a compound such as titanium oxide, zinc oxide, tin oxide, iron oxide, niobium oxide, cerium oxide, tungsten oxide, nickel oxide, strontium titanate, cadmium sulfide, lead sulfide, zinc sulfide, indium phosphide, copper-indium sulfide ($CuInS_2$), $CuAlO_2$, and $SrCu_2O_2$, and combination thereof. Among these, titanium oxide, zinc oxide, tin oxide, and niobium oxide are preferred, and titanium oxide is particularly preferred from a point of view of photoelectric conversion efficiency, stability, and safety. In addition, these semiconductor materials can also be employed as a mixture of two or more types.

In the present invention, titanium oxide encompasses various narrowly-defined titanium oxides such as anatase-type titanium oxide, rutile-type titanium oxide, amorphous titanium oxide, metatitanic acid, and orthotitanic acid, titanium hydroxide, hydrous titanium oxide, and the like, and they can be used alone or as a mixture. Two crystal system types of anatase type and rutile type can be in any form depending on a manufacturing method thereof or thermal hysteresis, however, the anatase type is general.

In the present invention, a semiconductor forming the porous semiconductor layer is preferably a polycrystalline sintered body composed of fine particles, from a point of view of stability, ease in crystal growth, manufacturing cost, and the like.

From a point of view of obtaining an effective surface area sufficiently great with respect to a projection area for conversion of incident light to electric energy at high yield, fine particles have an average particle size preferably not smaller than 5 nm and smaller than 50 nm and more preferably not smaller than 10 nm and not greater than 30 nm. The average particle size herein refers to a value determined by applying Scherrer's Equation to a spectrum obtained in X-ray diffraction measurement (a diffraction peak in XRD (X-ray diffraction)) as will be described later.

A light scattering property of photoelectric conversion layer 4 can be adjusted by adjusting a particle size (an average particle size) of a semiconductor material used for forming the layer.

Although depending on a condition for forming photoelectric conversion layer 4, specifically in a case of including a porous semiconductor formed from semiconductor particles great in average particles size, a light scattering property is high, incident light can be scattered, and thus a light capturing rate can be improved. Alternatively, in a case of including a porous semiconductor formed from semiconductor particles small in average particle size, a light scattering property is low and the number of dye adsorption points is increased so that an amount of adsorption can be increased.

Therefore, in the present invention, a layer formed of semiconductor particles having an average particles size preferably not smaller than 50 nm and more preferably not smaller than 50 nm and not greater than 600 nm may be provided on a polycrystalline sintered body formed of fine particles. Thus, a porous semiconductor forming photoelectric conversion layer 4 may have a stack structure.

Though an average particle size of a porous semiconductor material is not particularly limited so long as it is within the range preferably capable of exhibiting an effect of the present invention, an average particle size uniform to some extent is further preferred as in the case of commercially available semiconductor material powders, from a point of view of effective use of incident light for photoelectric conversion.

Though a film thickness of photoelectric conversion layer 4 is not particularly limited, from a point of view of photoelectric conversion efficiency, the film thickness is preferably not smaller than 0.1 µm and not greater than 50 µm. In particular, in a case of providing a layer having a high light scattering property and formed of semiconductor particles having an average particle size not smaller than 50 nm and not greater than 600 nm, the layer has a film thickness preferably not smaller than 0.1 µm and not greater than 40 µm and more preferably not smaller than 5 µm and not greater than 20 µm. On the other hand, in a case of providing a layer formed of semiconductor particles having an average particle size not smaller than 5 nm and smaller than 50 nm, the layer has a film thickness preferably not smaller than 0.1 µm and not greater than 50 µm and more preferably not smaller than 10 µm and not greater than 40 µm.

In order to improve photoelectric conversion efficiency of a wet-type solar battery, it is necessary to form photoelectric conversion layer 4 with a dye which will be described later being adsorbed to a porous semiconductor in a greater amount. Therefore, a film-shaped porous semiconductor having a large specific surface area is preferred, the specific surface area being preferably approximately from 10 to 200 $m^2/g$.

<Photosensitizer>

Examples of a dye functioning as a photosensitizer, to be adsorbed to a porous semiconductor, include organic dyes having absorbability in various visible light regions and/or infrared regions, metal complex dyes, and the like, and one, or two or more types, of these dyes can selectively be employed.

Examples of an organic dye include an azo-based dye, a quinone-based dye, a quinone-imine-based dye, a quinacridone-based dye, a squarylium-based dye, a cyanine-based dye, a merocyanine-based dye, a triphenylmethane-based dye, a xanthene-based dye, a perylene-based dye, an indigo-based dye, and the like.

An organic dye is generally higher in extinction coefficient than a metal complex dye in such a form that a molecule is coordinated to a transition metal.

Examples of a metal complex dye include a dye in which a molecule is coordinated to such a metal as Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te, and Rh, for example, a porphyrin-based dye, a phthalocyanine-based dye, a naphthalocyanine-based dye, and the like.

Among these, a phthalocyanine-based dye and a ruthenium-based metal complex dye are preferred, and a ruthenium-based metal complex dye is particularly preferred. In particular, ruthenium-based metal complex dyes expressed in the following formulae (1) to (3) are preferred.

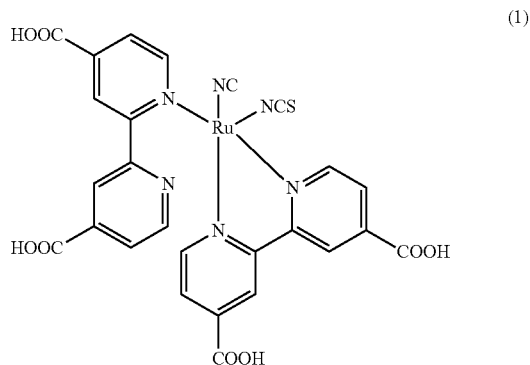

(1)

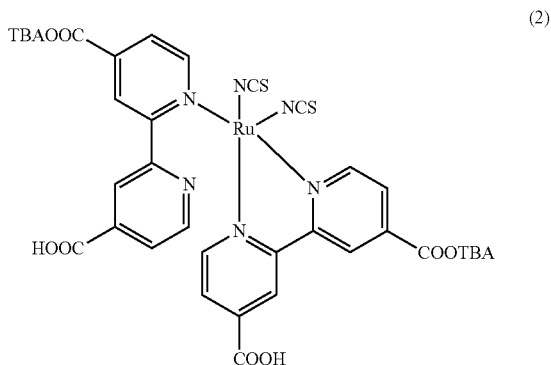

(2)

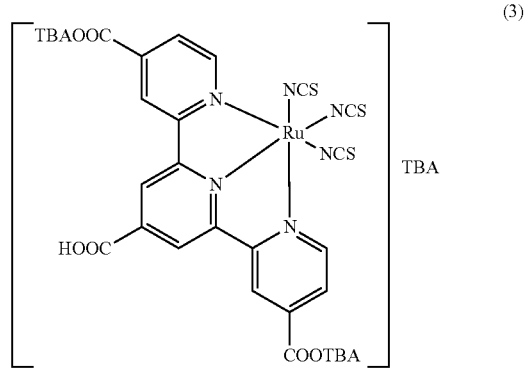

(3)

In order to securely adsorb a dye to a porous semiconductor, a dye molecule preferably has an interlocking group such as a carboxylic acid group, a carboxylic acid anhydride group, an alkoxy group, a hydroxyl group, a hydroxyalkyl group, a sulfonic acid group, an ester group, a mercapto group, and a phosphonyl group. Among these, a carboxylic acid group and a carboxylic acid anhydride group are particularly preferred. It is noted that an interlocking group provides electrical coupling facilitating electron transfer between a dye in an excited state and a conduction band of a porous semiconductor layer.

Examples of a quantum dot adsorbing to a porous semiconductor and functioning as a photosensitizer include CdS, CdSe, PbS, PbSe, and the like.

<Porous Insulating Layer>

In a wet-type solar battery, porous insulating layer 5 is generally provided between photoelectric conversion layer 4 and counter electrode conductive layer 6. As a material for porous insulating layer 5, a material high in level of a conduction band, such as glass, zirconium oxide, silicon oxide, aluminum oxide, niobium oxide, and strontium titanate is employed. In addition, a porous insulating layer formed of a particulate porous material is exemplified as porous insulating layer 5, and in this case, the particulate porous material has an average particle size preferably not smaller than 5 nm and not greater than 500 nm and more preferably not smaller than 10 nm and not greater than 300 nm.

Here, an insulating layer is generally provided as above between the photoelectric conversion layer and the counter electrode conductive layer. As disclosed in Japanese Patent Laying-Open No. 2007-194039, however, a single layer of a counter electrode conductive layer or a conductive layer may be formed on a photoelectric conversion layer containing a porous semiconductor formed of fine particles having a large particle size (not smaller than 100 nm and not smaller than 500 nm).

A photoelectric conversion layer containing a porous semiconductor having a high light scattering property, in particular a photoelectric conversion layer in contact with counter electrode conductive layer 6, may be low in mechanical strength, because a semiconductor material forming the photoelectric conversion layer has a large average particle size. The photoelectric conversion layer, however, may mechanically be strengthened by blending a semiconductor material small in average particle size in a semiconductor material large in average particle size, for example, at a ratio of 10 weight % or lower. In a case of forming a photoelectric conversion layer containing a porous semiconductor having a high light scattering property as well, leakage between the photoelectric conversion layer and the counter electrode conductive layer through the porous semiconductor having a high light scattering property can be prevented by providing protection film 9.

<Protection Film>

Protection film 9 formed in at least a part around photoelectric conversion layer 4 on the surface of first region 2a is provided for prevention of internal short-circuiting. In particular, it is preferably formed in a portion in the vicinity of scribe line 3 present between first region 2a and second region 2b, on the surface of first region 2a where photoelectric conversion layer 4 is not formed. Thus, as compared with a conventional structure where only a porous insulating layer is formed on glass where a conductive layer is formed, a film thickness of a portion on first region 2a where photoelectric conversion layer 4 is not to be formed, that is, a distance D1 from the surface of first region 2a where protection film 9 is formed to counter electrode conductive layer 6 directly on the same, increases, and thus internal short-circuiting as a result of impregnation of a material for counter electrode conductive layer 6 into porous insulating layer 5 to reach conductive layer 2 can be prevented.

A shape of protection film 9 is not particularly limited, and it should only be provided in at least a part around photoelectric conversion layer 4, on the surface of first region 2a as shown in FIGS. 1 and 2. In addition, photoelectric conversion layer 4 and protection film 9 may be in contact with each other. When they are in contact with each other, a non-light-receiving area leading to loss of efficiency is zero between photoelectric conversion layer 4 and scribe line 3, which is preferred.

Protection film 9 is preferably not greater in film thickness than photoelectric conversion layer 4. When protection film 9 is not greater in film thickness than photoelectric conversion layer 4, peel off or the like of porous insulating layer 5 can be suppressed when porous insulating layer 5 is formed with printing or the like, and thus yield can be improved. In addition, distance D1 which is a total film thickness of protection film 9 and porous insulating layer 5 in a portion where protection film 9 and porous insulating layer 5 are stacked is preferably not too small with respect to a film thickness of photoelectric conversion layer 4. Specifically, for example in a case where photoelectric conversion layer 4 has a film thickness of 10 μm, distance D1 is preferably not smaller than 8 μm and more preferably not smaller than 9 μm. In a case where the total film thickness of protection film 9 and porous insulating layer 5 is not smaller than 9 μm, an effect of prevention of short-circuiting between counter electrode conductive layer 6 and conductive layer 2 is very high, which is preferred. Namely, a film thickness of protection film 9 is desirably greater than a value obtained by subtracting a film thickness of porous insulating layer 5 from 9 μm. By setting such a film thickness, the effect of prevention of short-circuiting is sufficient.

As shown in FIG. 2, the effect of prevention of short-circuiting can be exhibited by forming protection film 9 in at least a part around photoelectric conversion layer 4 on the surface of first region 2a, however, a further higher effect can be exhibited by forming protection film 9 to surround photoelectric conversion layer 4 on the surface of first region 2a as shown in FIG. 4. The reason therefor will be described below. Namely, referring to FIG. 4, an edge (a chain dotted line in the figure) of counter electrode conductive layer 6 above first region 2a coinciding with an edge of photoelectric conversion layer 4 suffices from a point of view of a function of a wet-type solar battery, however, a position where counter electrode conductive layer 6 is formed may be displaced during manufacturing. In a case where such position displacement that counter electrode conductive layer 6 is not present above photoelectric conversion layer 4 takes place, manufacturing yield lowers. In order to prevent this, for example, as shown in FIG. 4, a method of forming counter electrode conductive layer 6 greater in area than photoelectric conversion layer 4 in advance so that counter electrode conductive layer 6 protrudes directly over photoelectric conversion layer 4 can be adopted. In this case, however, porous insulating layer 5 alone is interposed between protruding counter electrode conductive layer 6 and first region 2a, and therefore internal short-circuiting originating from this protruding counter electrode conductive layer 6 may occur.

In contrast, since protection film 9 surrounds photoelectric conversion layer 4 in FIG. 4, protection film 9 is interposed between a portion of counter electrode conductive layer 6 displaced from directly above photoelectric conversion layer 4 and the surface of first region 2a directly under the former (see protection film 9 on the left in FIG. 4). According to this construction, since distance D1 in this portion can also be increased by presence of protection film 9, a further higher effect of prevention of internal short-circuiting can be exhibited as described above.

A material high in level of a conduction band, such as glass, zirconium oxide, silicon oxide, aluminum oxide, niobium oxide, and strontium titanate, is exemplified as a material forming such protection film 9. Since protection film 9 is preferably placed in the vicinity of scribe line 3, a material high in film strength to such an extent as not experiencing peel off or the like even though a part thereof lies on recessed scribe line 3 is desirable. Specifically, a protection film containing glass, zirconium oxide, or silicon oxide is preferred, and in particular, from such a point of view as film strength, a protection film desirably contains at least any of zirconium oxide and silicon oxide. In particular, as protection film 9 is formed of a material the same as that for porous insulating layer 5, such an effect that peel off between protection film 9 and porous insulating layer 5 can significantly be suppressed is obtained.

In addition, in consideration of adsorption of a photosensitizer to a porous semiconductor, filling of photoelectric conversion layer 4 with a carrier transport material which will be described later, and the like, protection film 9 is preferably porous, and from a point of view of prevention of internal short-circuiting, protection film 9 has a pore diameter preferably not greater than a particle size of porous insulating layer 5. When a pore diameter of protection film 9 is not greater than a particle size of particles forming porous insulating layer 5, a material for porous insulating layer 5 does not enter protection film 9, and thus adsorption of a dye and filling of photoelectric conversion layer 4 with a carrier transport material can efficiently be carried out.

<Counter Electrode Conductive Layer>

Counter electrode conductive layer 6 has catalytic capability, and it is a layer having a combined construction of a catalyst layer having a function to reduce holes in a carrier transport layer and a conductive layer having a function to collect electrons and establish connection in series with an adjacent solar battery. In addition, in a case where a layer has these functions together, that is, in a case where a catalyst layer has high conductivity or in a case where a conductive layer has catalytic capability, such a layer alone can serve as counter electrode conductive layer 6. Moreover, an embodiment in which a catalyst layer is further provided separately from the counter electrode conductive layer is also encompassed in the present invention.

A material forming a conductive layer of counter electrode conductive layer 6 is not particularly limited so long as the material can generally be used for a solar battery and can exhibit an effect of the present invention. Examples of such a material include a metal oxide such as indium-tin composite oxide (ITO), fluorine-doped tin oxide (FTO), and zinc oxide (ZnO), and a metal material such as titanium, tungsten, gold, silver, copper, and nickel. Taking into account film strength, titanium is most preferred.

A material forming a catalyst layer is not particularly limited so long as the material can generally be used for a solar battery and can exhibit an effect of the present invention. For example, platinum or carbon is preferred as such a material.

Preferred forms of carbon include carbon black, graphite, glass carbon, amorphous carbon, hard carbon, soft carbon, carbon whisker, carbon nanotube, fullerene, and the like.

In a case of forming counter electrode conductive layer 6 constituted of a catalyst layer and a conductive layer, normally, a catalyst layer is formed on porous insulating layer 5 and a conductive layer is formed thereafter, to thereby form counter electrode conductive layer 6.

In a case where film strength is low as in the case of a catalyst layer formed with a vapor deposition method or the like, the conductive layer may peel off from the catalyst layer when the conductive layer is formed on the catalyst layer which has been formed on porous insulating layer 5. Then, in wet-type solar battery 10, such a counter electrode conductive layer 6 may be employed, in which a conductive layer is precedently provided on porous insulating layer 5 and then the catalyst layer is formed thereon, so that an order of stack is reverse to that of a normal dye sensitized solar battery. According to this stacking order, peel off of the conductive layer from the catalyst layer can be prevented.

In forming counter electrode conductive layer 6 with a vapor deposition method, the film itself becomes porous and therefore it is not necessary to newly form pores through which a dye solution or a carrier transport material can transfer. In a case of forming counter electrode conductive layer 6 with a vapor deposition method, a pore has a diameter approximately from 1 nm to 20 nm. The present inventors, however, have confirmed that, even though a catalyst layer is formed on counter electrode conductive layer 6, a material for the catalyst layer does not pass through pores in counter electrode conductive layer 6 to reach porous insulating layer 5 and further to a porous semiconductor (photoelectric conversion layer 4).

Alternatively, in a case where a catalyst layer is formed by applying a paste in which fine particles of platinum or carbon have been dispersed, counter electrode conductive layer 6 should be dense in order to suppress penetration of fine particles. In this case, pores in counter electrode conductive layer 6 should only be formed after the catalyst layer is stacked. In this case, examples of a preferred material for counter electrode conductive layer 6 include a metal oxide such as indium-tin composite oxide (ITO), fluorine-doped tin oxide (FTO), and zinc oxide (ZnO), a metal material such as titanium, tungsten, gold, silver, copper, and nickel, and the like. Any material capable of forming a dense film can be employed without being particularly limited.

A film thickness of counter electrode conductive layer 6 should only be selected as appropriate depending on resistivity of a material, with attention being paid to the fact that too small a thickness leads to high resistance and too great a thickness prevents transfer of a carrier transport material.

Pores can be formed by partially evaporating a material for counter electrode conductive layer 6, for example, with irradiation with laser beams.

Preferably, the pore has a diameter not smaller than 0.1 μm and not greater than 100 μm and the pores are formed at an interval not smaller than 1 μm and not greater than 200 μm, and more preferably, the pore has a diameter not smaller than 1 μm and not greater than 100 μm and the pores are formed at an interval not smaller than 5 μm and not greater than 200 μm.

<Cover Layer>

Cover layer 7 is provided in order to prevent volatilization of an electrolytic solution and introduction of water or the like into the battery.

A material forming cover layer 7 is not particularly limited so long as the material can generally be used for a solar battery and can exhibit an effect of the present invention. Examples of such a material include soda lime glass, lead glass, borosilicate glass, fused silica glass, crystalline silica glass, and the like. A particularly preferred material is soda lime float glass.

<Sealing Material>

Sealing material 8 is provided in order to prevent volatilization of an electrolytic solution and introduction of water or the like into the battery.

In addition, sealing material 8 is important for (i) absorbing a drop or stress (impact) applied to a support and (ii) absorbing bending or the like applied to a support during long-time use.

A material forming sealing material 8 is not particularly limited so long as the material can generally be used for a solar battery and can exhibit an effect of the present invention. For such a material, for example, a silicone resin, an epoxy resin, a polyisobutylene-based resin, such a hot melt resin as a polyamide-based resin, a polyolefin-based resin, and an ionomer resin, glass frit, and the like are preferred, and these materials can also be used as a mixture of two or more types, or two or more types of them can also be used as a stack structure including two or more layers. In a case where a nitrile-based solvent or a carbonate-based solvent is employed as a solvent for an oxidation-reduction electrolyte, a silicone resin, a polyisobutylene-based resin, a hot melt resin, and glass frit are particularly preferred.

<Carrier Transport Layer>

The "carrier transport layer" herein refers to a region sandwiched between cover layer 7 and conductive layer 2 on an inner side of sealing material 8, in which a carrier transport material has been introduced, and supported by sealing material 8 (within a thick frame A1 in FIG. 1). Therefore, at least photoelectric conversion layer 4 and porous insulating layer 5 are filled with a carrier transport material.

The carrier transport material is formed of a conductive material capable of transporting ions, and examples of a suitable material include a liquid electrolyte, a solid electrolyte, a gel electrolyte, a fused salt gel electrolyte, and the like.

A liquid electrolyte should only be a liquid substance containing redox species, and it is not particularly limited so long as it can generally be used in a battery, a solar battery, or the like. Specifically, a liquid electrolyte formed of redox species and a solvent capable of dissolving the same, a liquid electrolyte formed of redox species and fused salt capable of dissolving the same, and a liquid electrolyte formed of redox species, a solvent capable of dissolving the same, and fused salt are exemplified.

Examples of redox species include an $I^-/I_3^-$ type, a $Br^{2-}/Br^{3-}$ type, an $Fe^{2+}/Fe^{3+}$ type, a quinone/hydroquinone type, and the like.

Specifically, combination of iodine ($I_2$) and a metal iodide such as lithium iodide (LiI), sodium iodide (NaI), potassium iodide (KI), and calcium iodide ($CaI_2$), combination of iodine and tetraalkyl ammonium salt such as tetraethyl ammonium iodide (TEAI), tetrapropyl ammonium iodide (TPAI), tetrabutyl ammonium iodide (TBAI), and tetrahexyl ammonium iodide (THAI), and combination of bromine and a metal bromide such as lithium bromide (LiBr), sodium bromide (NaBr), potassium bromide (KBr), and calcium bromide ($CaBr_2$) are preferred, and among these, combination of LiI and $I_2$ is particularly preferred.

In addition, examples of a solvent for redox species include a carbonate compound such as propylene carbonate, a nitrile compound such as acetonitrile, alcohols such as ethanol, water, an aprotic polar substance, and the like. Among these, a carbonate compound or a nitrile compound is particularly preferred. These solvents can also be employed as a mixture of two or more types.

A solid electrolyte is a conductive material capable of transporting electrons, holes, and ions, and it may be any solid electrolyte that can be employed as an electrolyte for a solar battery and has no fluidity. Specifically, examples of a solid electrolyte include a hole transport material such as polycarbazole, an electron transport material such as tetranitro fluorenone, a conductive polymer such as polyrrole, a polymeric electrolyte obtained by solidifying a liquid electrolyte with a polymeric compound, a p-type semiconductor such as copper iodide or copper thiocyanate, an electrolyte obtained by solidifying a liquid electrolyte containing fused salt with fine particles, and the like.

A gel electrolyte is normally composed of an electrolyte and a gelling agent.

Examples of a gelling agent include a cross-linked polyacrylic resin derivative and a cross-linked polyacrylonitrile derivative, a polyalkylene oxide derivative, silicone resins, a polymeric gelling agent such as a polymer having a nitrogen-containing heterocyclic quaternary compound salt structure in a side chain, and the like.

A fused salt gel electrolyte is normally composed of the gel electrolyte as above and ambient-temperature fused salt.

Examples of ambient-temperature fused salt include nitrogen-containing heterocyclic quaternary ammonium salt compounds such as pyridinium salts and imidazolium salts, and the like.

An additive may be added as necessary to the electrolyte above.

Examples of such an additive include a nitrogen-containing aromatic compound such as t-butyl pyridine (TBP), and imidazole salt such as dimethylpropyl imidazole iodide (DMPII), methylpropyl imidazole iodide (MPII), ethylmethyl imidazole iodide (EMII), ethyl imidazole iodide (EII), and hexylmethyl imidazole iodide (HMII).

Electrolyte concentration in the electrolyte is preferably in a range not lower than 0.001 mol/liter and not higher than 1.5 mol/liter and particularly preferably in a range not lower than 0.01 mol/liter and not higher than 0.7 mol/liter. If a catalyst layer is located on a light receiving surface side, incident light passes through an electrolytic solution to reach a porous semiconductor layer and thus carriers are excited. Then, performance of photoelectric conversion may lower depending on electrolyte concentration. Therefore, in a case where wet-type solar battery 10 is constructed to have a catalyst layer on the light receiving surface side, electrolyte concentration is preferably set in consideration of this fact.

<Extraction Electrode>

Counter electrode conductive layer 6 is provided with an extraction electrode (not shown) as necessary. By using the extraction electrode, a current is taken out of the solar battery to the outside.

A material for forming an extraction electrode is not particularly limited so long as the material can generally be used for a solar battery and can exhibit an effect of the present invention.

<Method of Manufacturing Wet-Type Solar Battery>

A method of manufacturing a wet-type solar battery shown in FIG. 1 will be described.

The method of manufacturing a solar battery according to the present invention includes the steps of forming a stack in which conductive layer 2, photoelectric conversion layer 4 with a dye being adsorbed to a porous semiconductor, porous insulating layer 5, and counter electrode conductive layer 6 are stacked in this order, on one surface of support 1 composed of a light transmissive material, forming sealing material 8 around an outer periphery of the stack, arranging cover layer 7 supported by sealing material 8 to face support 1, and introducing a carrier transport material into a carrier transport layer A1 sandwiched between conductive layer 2 located on the inner side of sealing material 8 and cover layer 7 and supported by sealing material 8.

A method of forming conductive layer 2 on support 1 to fabricate transparent electrode substrate 11 is not particularly limited, and for example, a sputtering method, a spraying method, and the like which have been known are exemplified.

In a case where conductive layer 2 is provided with a metal lead (not shown), for example, a method of forming a metal lead on support 1 with a sputtering method, a vapor deposition method, and the like which have been known and forming conductive layer 2 on support 1 including the obtained metal lead, a method of forming conductive layer 2 on support 1 and forming a metal lead on conductive layer 2, and the like can be employed.

Scribe line 3 is formed by cutting conductive layer 2 with laser scribing. Thus, conductive layer 2 is divided into first region 2a and second region 2b.

As a method of forming a layer composed of a film-shaped porous semiconductor on first region 2a, a method of applying a paste containing semiconductor particles onto a conductive layer with a screen printing method, an ink jet method, and the like, and thereafter firing the conductive layer, a sol-gel method, a method making use of electrochemical oxidation-reduction reaction, and the like are exemplified. Among these methods, a screen printing method using a paste is particularly preferred because a layer composed of a thick porous semiconductor can be formed with low cost.

A method of forming a layer composed of a porous semiconductor with the use of a paste containing titanium oxide particles serving as semiconductor particles will specifically be described.

Initially, 125 mL of titanium isopropoxide (manufactured by Kishida Chemical Co., Ltd.) is dropped into 750 mL of 0.1 M nitric acid aqueous solution (manufactured by Kishida Chemical Co., Ltd.) to cause hydrolysis. The resultant substance is heated at 80° C. for 8 hours to prepare a sol. Thereafter, the obtained sol is heated in an autoclave made of titanium at 230° C. for 11 hours to grow titanium oxide particles. Then, ultrasonic dispersion is carried out for 30 minutes to prepare a colloid solution containing titanium oxide particles having an average particle size (an average primary particle size) of 15 nm. Then, ethanol twice as much in volume as the obtained colloid solution is added thereto and the resultant substance is subjected to centrifugal separation at the number of revolutions of 5000 rpm. Thus, titanium oxide particles are obtained.

It is noted that an average particle size herein is a value calculated from diffraction peak in XRD (X-ray diffraction). Specifically, an average particles size is calculated from a half width of a diffraction angle in θ/2θ measurement in XRD and from Schemes Equation. For example, in a case of anatase-type titanium oxide, a half width of a diffraction peak corresponding to a (101) plane (2θ=around 25.3°) should only be measured.

Then, the obtained titanium oxide particles are washed and thereafter a substance obtained by dissolving ethyl cellulose and terpineol in dehydrated ethanol is added thereto, followed by stirring, to thereby disperse titanium oxide particles. Thereafter, a mixture solution is heated under a vacuum condition to evaporate ethanol, to thereby obtain a titanium oxide paste. Concentration is adjusted, for example, such that final composition of titanium oxide solid concentration of 20 wt %, ethyl cellulose of 10 wt %, and terpineol of 64 wt % is achieved.

Examples of a solvent used for preparing a paste containing semiconductor particles (in which semiconductor particles are suspended) include, other than the above, a glyme-based solvent such as ethylene glycol monomethyl ether, an alcohol-based solvent such as isopropyl alcohol, a mixture solvent such as isopropyl alcohol/toluene, water, and the like.

Then, with such a method as the screen printing method or the ink jet method above, the paste containing semiconductor particles is applied onto the conductive layer and fired to thereby obtain a layer composed of a porous semiconductor. For drying and firing, depending on a type of a support or semiconductor particles to be used, such a condition as a temperature, a time period, and an atmosphere should be adjusted as appropriate. Firing can be carried out, for example, in an atmosphere or in an inert gas atmosphere in a range approximately from 50 to 800° C. for approximately 10 seconds to 12 hours. Drying and firing can be carried out once at a single temperature or two or more times with a temperature being varied. A layer composed of a porous semiconductor thus formed serves as photoelectric conversion layer 4 in FIG. 1 by adsorbing a dye in a step which will be described later.

As shown in FIGS. 1 and 2, a method of forming protection film 9 is not particularly limited, and a known method is exemplified. Specifically, methods of forming a film on a conductive layer include a method of applying a paste containing semiconductor particles onto a conductive layer with a screen printing method, an ink jet method, and the like and thereafter firing the conductive layer, a sol-gel method, a method making use of electrochemical oxidation-reduction reaction, and the like. Among these methods, a screen printing method using a paste is particularly preferred because a thick protection layer can be formed with low cost.

A method of forming film-shaped porous insulating layer 5 on a layer composed of a porous semiconductor serving as photoelectric conversion layer 4 is not particularly limited, and a known method is exemplified. Specifically, methods of forming a film on a conductive layer include a method of applying a paste containing semiconductor particles onto a conductive layer with a screen printing method, an ink jet method, and the like and thereafter firing the conductive layer, a sol-gel method, a method making use of electrochemical oxidation-reduction reaction, and the like. Among these methods, a screen printing method using a paste is particularly preferred because a thick porous insulating layer can be formed with low cost.

As a method of forming counter electrode conductive layer 6 on porous insulating layer 5, a vapor deposition method, a printing method, and the like are exemplified. In forming a counter electrode conductive layer with a vapor deposition method, the film itself becomes porous, and hence it is not necessary to newly form pores through which a dye solution or a carrier transport material can transfer.

In forming pores in counter electrode conductive layer 6, for example, a method of partial evaporation with irradiation with laser beams can be employed.

As a method of adsorbing a dye to a layer composed of a porous semiconductor, for example, a method of immersing the layer composed of the porous semiconductor formed on conductive layer 2 in a solution in which the dye has been dissolved (a dye adsorption solution) is exemplified. Any solvent capable of dissolving a dye is applicable as a solvent for dissolving a dye, and specifically, alcohols such as ethanol, ketones such as acetone, ethers such as diethyl ether and tetrahydrofuran, nitrogen compounds such as acetonitrile, halogenated aliphatic hydrocarbon such as chloroform, aliphatic hydrocarbon such as hexane, aromatic hydrocarbon such as benzene, esters such as ethyl acetate, water, and the like are exemplified. These solvents may be employed as a mixture of two or more types.

Dye concentration in a solution can be adjusted as appropriate depending on a type of a dye and a solvent to be used. For improvement in adsorption function, however, concentration is preferably as high as possible and concentration may be, for example, not lower than $5 \times 10^{-4}$ mol/liter.

Sealing material 8 is fabricated by cutting a heat seal film, an ultraviolet curable resin, or the like in a shape surrounding the stack.

In a case of using a silicone resin, an epoxy resin, or glass frit, a pattern of sealing material 8 can be formed with a dispenser, and in a case of using a hot melt resin, the pattern can be formed by making a patterned hole in a sheet-like hot melt resin.

Sealing material 8 is arranged between transparent electrode substrate 11 and cover layer 7 so as to bond them with each other, and fixed through heating or irradiation with ultraviolet rays.

A carrier transport material is introduced through an electrolyte (carrier transport material) introduction hole provided in advance in the cover layer and the carrier transport layer is filled therewith. The electrolyte introduction hole is sealed with an ultraviolet curable resin after introduction of the carrier transport material.

Through the steps above, wet-type solar battery 10 as shown in FIG. 1 is manufactured.

<Wet-Type Solar Battery Module>

Figure 5:
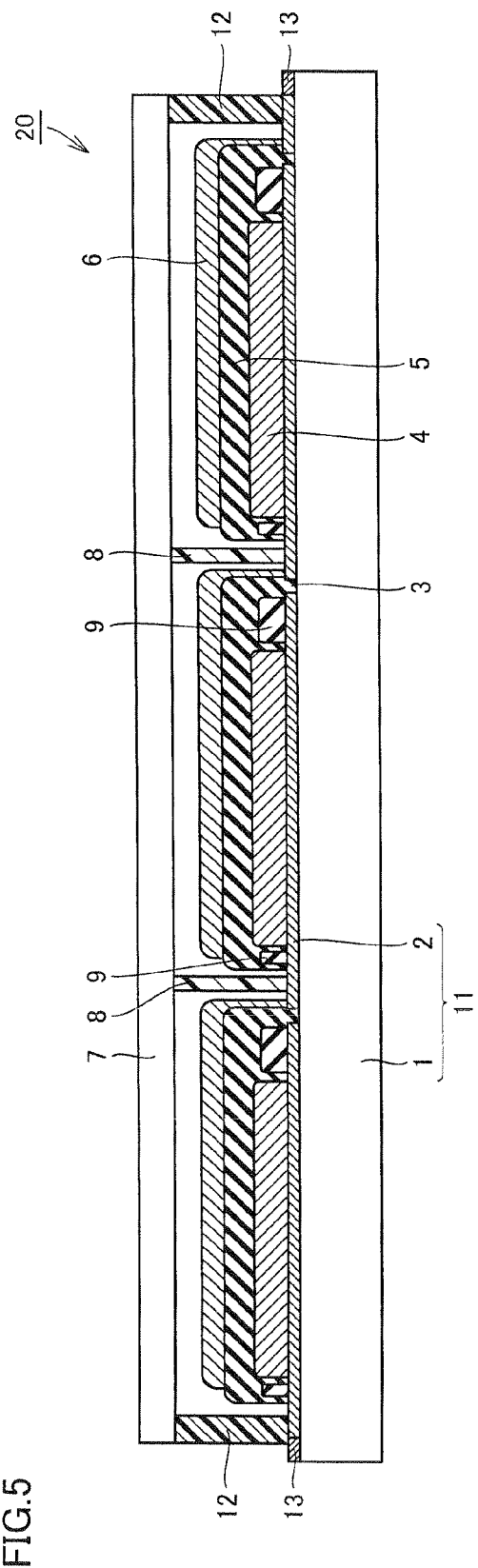
FIG. 5 is a schematic cross-sectional view showing a layered construction of a wet-type solar battery module in the embodiment of the present invention.

FIG. 5 is a schematic cross-sectional view of a main portion showing a layered construction of a wet-type solar battery module according to the present invention.

In FIG. 5, a wet-type solar battery module 20 is formed by connecting in series at least two wet-type solar batteries, and at least one of at least two solar batteries forming the solar battery module should only be the wet-type solar battery according to the present invention.

As shown in FIG. 5, wet-type solar battery module 20 includes a wet-type solar battery having transparent electrode substrate 11 constituted of support 1 and conductive layer 2 formed on one surface of support 1, a stack in which photoelectric conversion layer 4 formed on one surface of transparent electrode substrate 11 (on conductive layer 2) with a dye being adsorbed to a layer composed of a porous semiconductor, porous insulating layer 5, counter electrode conductive layer 6, and an optionally provided catalyst layer (not shown) are deposited in the order above, sealing material 8 formed around the outer periphery of the stack, and cover layer 7 arranged at a prescribed distance from the catalyst layer to face the same and supported by sealing material 8, and a carrier transport layer sandwiched between conductive layer 2 located on the inner side of sealing material 8 and cover layer 7 and supported by sealing material 8. At least one wet-type solar battery among these is wet-type solar battery 10 having protection film 9 formed. Alternatively, as shown in FIG. 3, all wet-type solar batteries included in the wet-type solar battery module may include the construction according to the present invention.

Adjacent wet-type solar batteries are characterized in that a catalyst layer or a counter electrode conductive layer in one wet-type solar battery and a conductive layer in the other solar battery are electrically connected to each other. A collector electrode portion 13 may be fabricated on conductive layer 2 located outside an outermost sealing material 12 of wet-type solar battery module 20.

In the wet-type solar battery module according to the present invention, since one of the solar batteries forming the module is the wet-type solar battery according to the present invention including the protection film, occurrence of failure due to internal short-circuiting can be suppressed and yield is improved in manufacturing of such a wet-type solar battery and a wet-type solar battery module.

Furthermore, the present inventors have developed a monolithic wet-type solar battery module (Japanese Patent Laying-Open No. 2008-016351) having such a construction that an intercell insulating layer is provided between cells in order to improve integration. In this construction of the wet-type solar battery module, not only the intercell insulating layer and the porous insulating layer come in contact with each other but also the intercell insulating layer and the counter electrode conductive layer come in contact with each other. The present inventors have found that, in the wet-type solar battery module having this construction, as the counter electrode conductive layer enters a boundary region where the intercell insulating layer and the porous insulating layer come in contact with each other, leakage may occur. According to the wet-type solar battery module having protection film 9 described above, since protection film 9 is constructed to be covered with porous insulating layer 5, the problem above in the wet-type solar battery module described in Japanese Patent Laying-Open No. 2008-016351 can be solved.

EXAMPLES

Though the present invention will be described further specifically with reference to Examples 1 to 13 and Comparative Examples 1 to 3, the present invention is not limited by these Examples and Comparative Examples.

<Fabrication of Wet-Type Solar Battery>

Examples 1 to 6

As shown in FIGS. 1 and 2, transparent electrode substrate 11 (manufactured by Nippon Sheet Glass Co., Ltd., glass with an $SnO_2$ film) of 30 mm×30 mm×1.0 mm thick, in which conductive layer 2 formed from an $SnO_2$ film had been formed on support 1 composed of glass, was prepared. Conductive layer 2 in transparent electrode substrate 11 was cut with laser scribing to form scribe line 3, so that conductive layer 2 was divided into first region 2a and second region 2b. Then, a screen plate having a pattern of a layer composed of a porous semiconductor and a screen printer (manufactured by Newlong Seimitsu Kogyo Co., Ltd., model number: LS-150) were used to apply a commercially available titanium oxide paste (manufactured by Solaronix, trade name: D/SP) to first region 2a and leveling for 1 hour at room temperature was carried out. Thereafter, the obtained coating film was dried for 20 minutes in an oven set at 80° C. and further fired for 60 minutes in air by using a firing furnace (manufactured by Denken Co., Ltd., model number: KDF P-100) set at 500° C. This application and firing step was repeated three times, to thereby obtain a layer composed of a porous semiconductor having a film thickness of 10 μm. Namely, in the present Example, photoelectric conversion layer 4 had a film thickness of 10 μm.

A distance D2 from the layer composed of the porous semiconductor to scribe line 3 was measured and 10 wet-type solar batteries with D2=1000 μm were fabricated.

At this stage, peel off of the porous semiconductor layer was visually inspected in each of Examples 1 to 6 and a ratio of peel off was calculated. Table 1 shows the results, and peel off of the porous semiconductor layer was observed in none of the Examples.

Then, as shown in FIGS. 1 and 2, protection film 9 was formed in parallel to scribe line 3, in the vicinity of scribe line 3 in a portion of first region 2a where photoelectric conversion layer 4 was not formed. Specifically, a paste containing silica particles (average particles size of 50 nm) was applied in parallel to scribe line 3 with the use of a screen printer, in the vicinity of scribe line 3 on the surface of first region 2a. Thereafter, firing at 500° C. was carried out for 60 minutes, so that protection film 9 with a distance from conductive layer 2 to a flat portion of an upper surface of protection film 9 (a film thickness of protection film 9) being 1 μm, 2 μm, 3 μm, 4 μm, 5 μm, or 9 μm was formed. The protection film having a film thickness of 1 μm was defined as Example 1, the protection film having a film thickness of 2 μm was defined as Example 2, the protection film having a film thickness of 3 μm was defined as Example 3, the protection film having a film thickness of 4 μm was defined as Example 4, the protection film having a film thickness of 5 μm was defined as Example 5, and the protection film having a film thickness of 9 μm was defined as Example 6.

Then, a paste containing zirconia particles (average particle size of 50 nm) was applied onto the layer composed of the porous semiconductor with the use of a screen printer and thereafter firing at 500° C. was carried out for 60 minutes, so that porous insulating layer 5 with a distance from the surface of the layer composed of the porous semiconductor to a flat portion of an upper surface of porous insulating layer 5 (a film thickness of porous insulating layer 5) being 7 μm was formed.

At this stage, peel off of porous insulating layer 5 was visually inspected in each of Examples 1 to 6 and a ratio of peel off was calculated. Table 1 shows the results, and peel off of porous insulating layer 5 was observed in none of the Examples. Then, a mask having a prescribed pattern formed and a vapor deposition apparatus (manufactured by Anelva Corporation, model number: EVD500A) were used to form titanium to a film thickness of 400 nm on porous insulating layer 5 at a vapor deposition rate of 8 Å/s. Thus, counter electrode conductive layer 6 was obtained.

A mask further having a prescribed pattern formed and the vapor deposition apparatus (manufactured by Anelva Corporation, model number: EVD500A) were used to form Pt on counter electrode conductive layer 6 at a vapor deposition rate of 4 Å/s, to thereby obtain a catalyst layer. It is noted that a size (shape) and a position in a direction of width of the catalyst layer were the same as those of the layer composed of the porous semiconductor.

Ten solar batteries each including the support including the stack up to the catalyst layer were checked for internal short-circuiting with a tester and a ratio of short-circuiting (%) was calculated. Table 1 shows the results. In Examples 1 to 6, internal short-circuiting was not observed.

Then, the support including the stack was immersed in a dye adsorption solution prepared in advance at room temperature for 100 hours and thereafter the support including the stack was washed with ethanol and dried at approximately 60° C. for approximately 5 minutes, so that the dye was adsorbed on the layer composed of the porous semiconductor and photoelectric conversion layer 4 was thus formed. The adsorption dye solution was prepared by dissolving a dye shown in the formula (2) above (manufactured by Solaronix, trade name: Ruthenium 620 1H3TBA) in a mixture solvent of acetonitrile and t-butanol at a volume ratio of 1:1 such that concentration attained to $4 \times 10^{-4}$ mol/liter.

Then, the support having the stack formed and the glass substrate implementing cover layer 7 were bonded to each other with the use of a heat seal film (manufactured by Du Pont Kabushiki Kaisha, Himilan 1855) cut in a shape surrounding the stack, and heated for 10 minutes in an oven set to approximately 100° C. for compression bonding. It is noted that the molten heat seal film becomes sealing material 8.

Then, an electrolytic solution (a carrier transport material) prepared in advance was introduced through an electrolytic solution introduction hole provided in advance in the glass substrate implementing cover layer 7 and the electrolytic solution introduction hole was sealed with an ultraviolet curable resin (manufactured by ThreeBond Co., Ltd., model number: 31X-101). Thus, a wet-type solar battery (single cell) where the carrier transport layer was filled with the carrier transport material was completed.

The electrolytic solution serving as the carrier transport material was obtained by employing acetonitrile as the solvent, adding LiI (manufactured by Aldrich) and $I_2$ (manufactured by Kishida Chemical Co., Ltd.) as redox species such that their concentrations were set to 0.1 mol/liter and 0.01 mol/liter, respectively, and further adding t-butyl pyridine (manufactured by Aldrich) and dimethyl propyl imidazole iodide (manufactured by Shikoku Chemicals Corporation) both as additives such that their concentrations were set to 0.5 mol/liter and 0.6 mol/liter, respectively, and dissolving these.

An Ag paste (manufactured by Fujikura Kasei Co., Ltd., trade name: Dotite) was applied as a collector electrode portion to the obtained wet-type solar battery.

Comparative Examples 1 to 3

In Comparative Example 1, a wet-type solar battery was fabricated through the steps the same as in Example 1, except for not forming protection film 9. In Comparative Examples 2 and 3, wet-type solar batteries were fabricated through the steps the same as in Example 1, except for forming protection films 9 having film thicknesses of 11 μm (Comparative Example 2) and 15 μm (Comparative Example 3), respectively.

In Comparative Examples 1 to 3, as in Examples 1 to 6, peel off of the porous semiconductor layer after formation thereof and peel off of the porous insulating layer after formation thereof were visually inspected. Although peel off of an outer layer after formation of the porous semiconductor layer was not observed, peel off of the porous insulating layer after formation thereof was confirmed in Comparative Example 2 and Comparative Example 3. Table 1 shows the results of a ratio of peel off (%).

In addition, in Comparative Example 1, as in Examples 1 to 6, internal short-circuiting in the solar battery including the support including the stack up to the catalyst layer was checked with a tester and a ratio of short-circuiting (%) was calculated. Table 1 shows the results. In Comparative Example 1, short-circuiting was confirmed in all stacks. In addition, in Comparative Examples 2 and 3, peel of the porous insulating layer was confirmed at the stage after formation thereof and hence measurement of internal short-circuiting was not conducted.

<Evaluation Method and Results>

A black mask having an area of an opening of 1.0 cm² was placed at the light receiving surface of the wet-type solar battery in each of Examples 1 to 6 and Comparative Examples 1 to 3, this solar battery was irradiated with light at intensity of 1 kW/m² (AM 1.5 solar simulator), and photoelectric conversion efficiency (%) was measured. Table 1 shows the results. In addition, Table 1 also shows D1 (a distance calculated by adding a film thickness of protection film 9 to a film thickness of a porous insulating layer stacked on protection film 9).

TABLE 1

| | D1 (μm) | D2 (μm) | Ratio of Peel Off of Photo-electric Con-version Layer (%) | Ratio of Peel Off of Porous Insulating Layer (%) | Ratio of Short-Circuiting (%) | Photo-electric Con-version Efficiency (%) |
|---|---|---|---|---|---|---|
| Example 1 | 8 | 1000 | 0 | 0 | 10 | 8.1 |
| Example 2 | 9 | 1000 | 0 | 0 | 0 | 8.2 |
| Example 3 | 10 | 1000 | 0 | 0 | 0 | 8.2 |
| Example 4 | 11 | 1000 | 0 | 0 | 0 | 8.2 |
| Example 5 | 12 | 1000 | 0 | 0 | 10 | 8.2 |
| Example 6 | 16 | 1000 | 0 | 0 | 0 | 8.1 |
| Comparative Example 1 | 7 | 1000 | 0 | 0 | 100 | 4.2 |
| Comparative Example 2 | 18 | 1000 | 0 | 70 | — | — |
| Comparative Example 3 | 22 | 1000 | 0 | 100 | — | — |

In Table 1, it was found from comparison between Examples 1 to 6 and Comparative Example 1 that, by providing protection film 9 in the wet-type solar battery, occurrence of internal short-circuiting was suppressed and yield could be improved, and thus an average value of photoelectric conversion efficiency was enhanced. In addition, it was found from comparison between Examples 1 to 6 and Comparative Examples 2 and 3 that, as a film thickness of protection film 9 was made greater than a film thickness of photoelectric conversion layer 4 in the wet-type solar battery, the porous insulating layer peeled off.

Examples 7 to 12

As shown in FIGS. 3 and 4, transparent electrode substrate 11 (manufactured by Nippon Sheet Glass Co., Ltd., glass with an $SnO_2$ film) of 30 mm×30 mm×1.0 mm thick, in which conductive layer 2 formed from an $SnO_2$ film had been formed on support 1 composed of glass, was prepared. Conductive layer 2 in transparent electrode substrate 11 was cut with laser scribing to form scribe line 3, so that conductive layer 2 was divided into first region 2a and second region 2b. Then, a screen plate having a pattern of a layer composed of a porous semiconductor and a screen printer (manufactured by Newlong Seimitsu Kogyo Co., Ltd., model number: LS-150) were used to apply a commercially available titanium oxide paste (manufactured by Solaronix, trade name: D/SP) to first region 2a and leveling for 1 hour at room temperature was carried out. Thereafter, the obtained coating film was dried for 20 minutes in an oven set at 80° C. and further fired for 60 minutes in air by using a firing furnace (manufactured by Denken Co., Ltd., model number: KDF P-100) set at 500° C. This application and firing step was repeated three times, to thereby obtain a layer composed of a porous semiconductor having a film thickness of 10 μm.

Distance D2 from the layer composed of the porous semiconductor to scribe line 3 was measured and 10 wet-type solar batteries with D2=1000 μM were fabricated.

At this stage, peel off of the porous semiconductor layer was visually inspected in each of Examples 7 to 12 and a ratio of peel off was calculated. Table 2 shows the results, and peel off of the porous semiconductor layer was observed in none of the Examples.

Then, as shown in FIGS. 3 and 4, protection film 9 was formed to surround photoelectric conversion layer 4 on first region 2a. Specifically, a paste containing silica particles (average particles size of 50 nm) was applied to surround photoelectric conversion layer 4 on the surface of first region 2a, with the use of a screen printer. Thereafter, firing at 500° C. was carried out for 60 minutes, so that protection film 9 with a distance from conductive layer 2 to a flat portion of an upper surface of protection film 9 (a film thickness of protection film 9) being 1 μm, 2 μm, 3 μm, 4 μm, 5 μm, or 9 μm was formed. The protection film having a film thickness of 1 μm was defined as Example 7, the protection film having a film thickness of 2 μm was defined as Example 8, the protection film having a film thickness of 3 μm was defined as Example 9, the protection film having a film thickness of 4 μm was defined as Example 10, the protection film having a film thickness of 5 μm was defined as Example 11, and the protection film having a film thickness of 9 μm was defined as Example 12.

Then, a paste containing zirconia particles (average particle size of 50 nm) was applied onto the layer composed of the porous semiconductor with the use of a screen printer and thereafter firing at 500° C. was carried out for 60 minutes, so that porous insulating layer 5 with a distance from the surface of the layer composed of the porous semiconductor to a flat portion of an upper surface of porous insulating layer 5 (a film thickness of porous insulating layer 5) being 7 μm was formed.

Subsequent steps were performed as in Example 1 for fabrication. In Examples 7 to 12 as well, as in Examples 1 to 6, after porous insulating layer 5 was formed, peel off of porous insulating layer 5 was visually inspected and a ratio of peel off was calculated. Table 2 shows the results, and peel off of porous insulating layer 5 was observed in none of the Examples.

<Evaluation Method and Results>

A black mask having an area of an opening of 1.0 $cm^2$ was placed at the light receiving surface of the wet-type solar battery in each of Examples 7 to 12, this solar battery was irradiated with light at intensity of 1 $kW/m^2$ (AM 1.5 solar simulator), and photoelectric conversion efficiency was measured. Table 2 shows the results.

TABLE 2

| | D1 (μm) | D2 (μm) | Ratio of Peel Off of Photo-electric Con-version Layer (%) | Ratio of Peel Off of Porous Insulating Layer (%) | Ratio of Short-Circuiting (%) | Photo-electric Con-version Efficiency (%) |
|---|---|---|---|---|---|---|
| Example 7 | 8 | 1000 | 0 | 0 | 5 | 8.2 |
| Example 8 | 9 | 1000 | 0 | 0 | 0 | 8.2 |
| Example 9 | 10 | 1000 | 0 | 0 | 0 | 8.1 |
| Example 10 | 11 | 1000 | 0 | 0 | 0 | 8.2 |
| Example 11 | 12 | 1000 | 0 | 0 | 0 | 8.2 |
| Example 12 | 16 | 1000 | 0 | 0 | 0 | 8.1 |
| Example 13 | 14 | 1000 | 0 | 0 | 0 | 7.7 |

<Fabrication of Wet-Type Solar Battery Module>

Example 13

The wet-type solar battery module shown in FIG. 5 was fabricated. Initially, transparent electrode substrate 11 having conductive layer 2 formed on the surface thereof (manufactured by Nippon Sheet Glass Co., Ltd., trade name: glass with an $SnO_2$ film: 60 mm long×37 mm wide) was prepared, and conductive layer 2 was cut by forming scribe line 3 in parallel to a longitudinal direction by laser-scribing the $SnO_2$ film on the surface of transparent electrode substrate 11. Scribe lines 3 were formed at 4 locations in total, i.e., at a position distant by 9.5 mm from the left end of the glass substrate serving as support 1 and at positions at intervals of 7 mm. Formed scribe line 3 had a width of 100 μm.

Then, a layer composed of a porous semiconductor was formed in accordance with Example 7. The formed layer composed of the porous semiconductor having a film thickness of 10 μm and a size of 5 mm wide and 50 mm long was formed around a position distant by 6.9 mm from the left end of the glass substrate, and three layers of the same size were formed at intervals of 7 mm from the center of this porous semiconductor film.

D2 in this case was 1000 μm.

Then, protection film 9 having a film thickness of 7 μm was formed as in Example 7, between scribe line 3 and the layer composed of the porous semiconductor.

Porous insulating layer 5 was formed on the layer composed of the porous semiconductor in accordance with Example 7. Formed porous insulating layer 5 having a size of 5.6 mm wide and 50.4 mm long was rimmed around a position distant by 6.9 mm from the left end of transparent electrode substrate 11, and three layers of the same size were formed at intervals of 7 mm from the center of porous insulating layer 5 at the left end. The film thickness was 7 p.m.

Then, counter electrode conductive layer 6 was formed in accordance with Example 7. Formed counter electrode conductive layer 6 having a size of 5.6 mm wide and 50 mm long was formed around a position distant by 7.2 mm from the left end of transparent electrode substrate 11, and three layers of the same size were formed at intervals of 7 mm from the center of porous insulating layer 5 at the left end. Then, Pt was formed on counter electrode conductive layer 6 in accordance with Example 1 to thereby obtain the catalyst layer. It is noted that a size (shape) and a position in a direction of width of the catalyst layer were the same as those of the layer composed of the porous semiconductor.

The obtained stack was immersed in a dye adsorption solution employed in Example 7 at room temperature for 120 hours so that the dye adsorbed to the layer composed of the porous semiconductor and photoelectric conversion layer 4 was thus formed.

Then, an ultraviolet curable resin (manufactured by Three-Bond Co., Ltd., 31X-101) was applied in between the stacks and around the cell with the use of a dispenser (manufactured by EFD, ULTRASAVER), and a glass substrate implementing cover layer 7 of 60 mm long×30 mm wide was bonded as a cover layer 38. The glass substrate was irradiated with ultraviolet rays from an ultraviolet lamp (manufactured by EFD, NOVACURE) to thereby cure a photosensitive resin, and thus sealing material 8 and outermost sealing material 12 were formed.

An electrolytic solution (a carrier transport material) the same as in Example 1 was introduced through the electrolytic solution introduction hole provided in advance in the glass substrate implementing cover layer 7, the ultraviolet curable resin was further applied, and the resin was irradiated with ultraviolet rays similarly to the sealing material. The resin was cured and sealing was achieved, and a carrier transport layer was formed and the wet-type solar battery module was completed.

An Ag paste (manufactured by Fujikura Kasei Co., Ltd., trade name: Dotite) was applied as collector electrode portion 13 to the obtained wet-type solar battery module.

<Evaluation Method and Results>

A black mask having an area of an opening of 13 $cm^2$ was placed at a light receiving surface of the wet-type solar battery module in Example 13, this solar battery was irradiated with light at intensity of 1 $kW/m^2$ (AM 1.5 solar simulator), and photoelectric conversion efficiency was measured. Table 2 shows the results.

It should be understood that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

Reference Signs List

1 support; 2 conductive layer; 2a first region; 2b second region; 3 scribe line; 4 photoelectric conversion layer; 5 porous insulating layer; 6 counter electrode conductive layer; 7 cover layer; 8, 12 sealing material; 9 protection film; 10 wet-type solar battery; 11 transparent electrode substrate; 13 collector electrode portion; and 20 wet-type solar battery module.

The invention claimed is:

1. A wet-type solar battery, comprising:
   a support comprising a light transmissive material; and
   a stack in which a conductive layer, a photoelectric conversion layer containing a porous semiconductor, a porous insulating layer, and a counter electrode conductive layer are stacked in this order,
   said conductive layer being divided into a first region including a portion where the photoelectric conversion layer is to be formed on a surface thereof and a second region where the photoelectric conversion layer is not to be formed,
   a protection film configured to prevent internal short-circuiting, not greater in film thickness in a stacking direction of said stack than a thickness in said stacking direction of said stack of said photoelectric conversion layer, said protection film being formed in at least a part around the photoelectric conversion layer on a surface of said first region and adjacent a side periphery of said photoelectric conversion layer, said protection film not being formed on a top surface said photoelectric conversion layer,
   a scribe line present between said first region and said second region,
   said counter electrode conductive layer including a side portion on said second region, and
   said protection film being positioned between said photoelectric conversion layer on said first region and said side portion of said counter electrode conductive layer, and at least one part of said porous insulating layer being formed on said protection film,
   wherein said protection film is porous, said protection film has a pore diameter not greater than a particle size of particles forming said porous insulating layer, said protection film is separate from said porous insulating layer, and said porous insulating layer is formed after said protection film is formed.

2. The wet-type solar battery according to claim 1, wherein a total film thickness of said protection film and said porous insulating layer stacked on said protection film is not smaller than 10 μm.

3. The wet-type solar battery according to claim 1, wherein a material for said protection film includes at least any of zirconium oxide and silicon oxide.

4. The wet-type solar battery according to claim 1, wherein said protection film and said porous insulating layer are identical to each other in material.

5. A wet-type solar battery module, comprising:
two or more wet-type solar batteries connected in series,
at least one of the wet-type solar batteries being said wet-type solar battery according to claim 1, and
a counter electrode conductive layer of one wet-type solar battery of adjacent wet-type solar batteries being electrically connected to a conductive layer of the other wet-type solar battery.

6. The wet-type solar battery according to claim 1, wherein said protection film is provided to surround said photoelectric conversion layer on the surface of said first region.

\* \* \* \* \*